United States Patent [19]

Haberthür-Heilig

[11] Patent Number: 4,514,794
[45] Date of Patent: Apr. 30, 1985

[54] ATTACHMENT PROVISION FOR EXCHANGEABLE ACCESSORIES AT ILLUMINATION BODIES

[75] Inventor: Walter Haberthür-Heilig, Hofstettin, Switzerland

[73] Assignee: Bron Elektronik AG, Allschwil, Switzerland

[21] Appl. No.: 515,917

[22] Filed: Jul. 30, 1983

[30] Foreign Application Priority Data

Jul. 21, 1982 [DE] Fed. Rep. of Germany ....... 3227167

[51] Int. Cl.³ .......................... F21S 1/02; F21S 13/02
[52] U.S. Cl. .......................................... 362/439; 362/3; 362/16; 362/17; 362/18; 362/437; 362/448; 362/449
[58] Field of Search ............... 362/437, 439, 448, 449, 362/3, 16, 18, 17

[56] References Cited

U.S. PATENT DOCUMENTS

| | | | |
|---|---|---|---|
| 1,557,515 | 10/1925 | Wooley | 362/439 |
| 1,942,804 | 1/1934 | Deutsch | 362/439 |
| 2,337,824 | 12/1943 | Kraut | 362/439 |
| 2,564,754 | 8/1951 | Dack | 362/439 |
| 3,126,160 | 3/1964 | Berger | 362/437 |
| 4,360,861 | 11/1982 | Fitzgerald | 362/439 |

*Primary Examiner*—Stephen J. Lechert, Jr.
*Assistant Examiner*—Howard J. Locker
*Attorney, Agent, or Firm*—Horst M. Kasper

[57] ABSTRACT

An attachment provision is provided for exchangeable accessories for illumination bodies, which comprises an adapter plate having a receiving opening and which plate is attached to an illumination body for supporting an accessory having an axis. The adapter plate has at least two recesses for receiving and supporting an adapter flange of an accessory. The recesses are disposed at a distance, but are not disposed such that they would meet the requirements of an n-fold rotation axis with n equal to or larger than 2 for said axis. The accessory is provided with an adapter flange with at least two cam toes to grip through the recesses of the adapter plate. The cam toes are disposed at a distance, but are not disposed such that they would meet the requirements of an n-fold rotation axis directed vertically to the flange plane with n equal to or larger than 2 for said axis and where the cam toes support the accessory.

20 Claims, 4 Drawing Figures

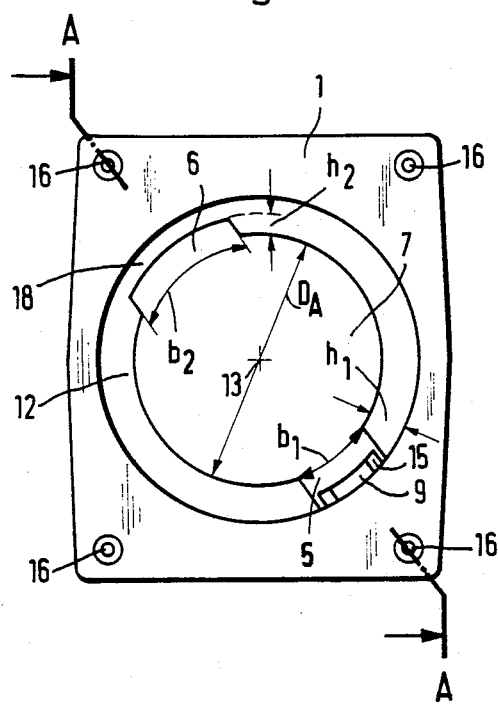
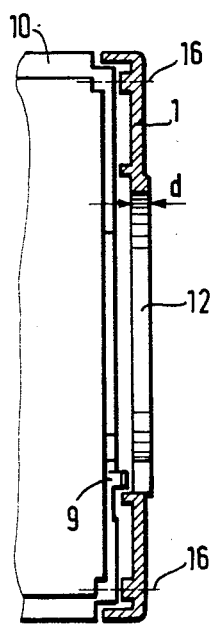

ATTACHMENT PROVISION FOR EXCHANGEABLE ACCESSORIES AT ILLUMINATION BODIES

BACKGROUND OF THE INVENTION

1. Field of the Invention

The present invention relates to an attachment provision for exchangeable accessories such as reflectors or diffusing screens at illumination bodies.

2. Brief Description of the Background of the Invention Including Prior Art

Exchangeable accessories such as reflectors are fixed to conventional illumination bodies by way of screws. However, such an attachment is impractical, since the exchanging is time consuming and cannot be performed without the use of tools.

In general bayonet closures are known, which however only allow fixture of the part inserted in a preset position as determined by the bayonet connection.

SUMMARY OF THE INVENTION

1. Purposes of the Invention

It is an object of the present invention to provide an attachment provision according to the preamble of claim 1 such that a rapid exchange of the accessory is possible from the fixed position at the illumination body.

It is another object of the present invention to provide an attachment provision for accessories of lighting fixtures, which allows easy alignment of the accessory around its center axis.

It is a further object of the invention to provide an attachment provision for lighting fixtures, which is constructed in a simple way, which does not require any tools for installation or demounting, where fastener parts cannot be lost, and which can be maintained by unskilled personnel, and which is safe.

These and other objects and advantages of the present invention will become evident from the description which follows.

2. Brief Description of the Invention

The present invention provides an attachment provision for exchangeable accessories for illumination bodies which comprises an adapter plate having a receiving opening and which is attached to an illumination body for supporting an accessory having an axis and the adapter plate having at least two recesses for receiving and supporting an adapter flange of an accessory and wherein the recesses are disposed at a distance, but are not disposed such that they would meet the requirements of an n-fold rotation axis with n equal to or larger than 2 coinciding with said axis, and an accessory having an adapter flange with at least two cam toes to pass through the recesses of the adapter plate where the cam toes are disposed at a distance, but are not disposed such that they would meet the requirements of an n-fold rotation axis directed vertically to the flange plane with n equal to or larger than 2 for said axis and where the cam toes when engaged to the adapter plate support the accessory.

The cam toes can have differing widths, differing radial extensions, and the middle centers in case of two cam toes can be disposed at circumferential locations where the intermediate angles are different from 180 degrees.

The cam toes of the adapter flange can grip over the adapter plate rim upon insertion and rotation. There can be only one relative radial position over an angle range of 360 degrees which allows removal of the adapter flange from the supporting adapter plate. The receiving opening of the adapter plate can be a substantially circular opening concentric to the middle axis. The adapter flange can comprise a cylindrical internal hub, the outer diameter of which corresponds about to the inner diameter of the receiving and opening and cam toes are disposed on the outer rim of the adapter flange. The internal hub of the adapter flange can be attached on the backside of an accessory, modifying the direction of the light coming from the illumination body, in a position coaxial to the optical axis of the accessory. The internal hub can be guided and supported with its jacket part in the receiving opening of the adapter plate. The adapter flange with the accessory can be formed as one piece.

The cam toes can be provided with differing widths and with differing radial extension and the recesses can be each corresponding to one cam toe of correspondingly different width and radial depth. One cam toe can be wider in circumferential direction than the other cam toe and the wider cam toe can be radially less extended than the other cam toe.

The angular distances of the cam toes from each other and of the recesses from each other can be the same angle values. The adapter plate with the illumination body is formed as one piece. A spring element can protrude into one recess as a catching device. The spring element can protrude by a preset amount radially into the recess corresponding to the radially higher extended toe cam, where the amount is smaller or equal to the length difference of the two cam toes. The edges of the spring element disposed in radial direction and of the corresponding cam toe can be inclined, such that the inclined faces are directed toward each other. The spring element is disposed at the back side of the adapter plate and provided with the adapter plate as a single part. The spring element can be disposed on the side of the illumination body located closer toward the adapter plate and is formed with the adapter plate as one piece.

There is also provided an attachment provision for exchangeable accessories such as reflectors, diffusing screens or the like at illumination bodies and in particular flash lamps where an adapter plate with a recess for an adapter flange disposed at an accessory is attached to the illumination body, and where at least two toe cams of different dimensions are disposed at the adapter flange at a distance from each other, which grip the edge of the adapter plate over an angle of about 360 degrees around a middle axis of the adapter plate, where in each case a recess coordinated to a cam toe and corresponding to the dimensions of the coordinated cam toe is provided in the edge of the adapter plate for the release of the cam toe.

There is further provided a method for attaching and demounting of exchangeable accessories at illumination bodies which comprises attaching an adapter plate at the illumination body with a recess for an adapter flange at an accessory, providing at least two cam toes of different dimensions at a distance from each other at an adapter flange, which are adapted to grip over the edge of the adapter plate over an angle of about 360 degrees around a middle axis of the adapter plate, passing the toe cams attached to the edge of the adapter flange through the corresponding recesses in the edge of the adapter plate for releasing the accessory from the illumination body or for attaching the accessory to the illumination body.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 1 is a schematic view of an adapter plate,

FIG. 2 is a section along section line A—A of FIG. 1 with an illumination body shown in part.

DESCRIPTION OF INVENTION AND PREFERRED EMBODIMENTS

Figure 4:
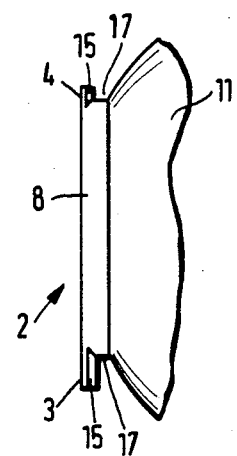
FIG. 4 is a side view onto the adapter flange with a reflector shown in part according to arrow X of FIG. 3.
Figure 3:
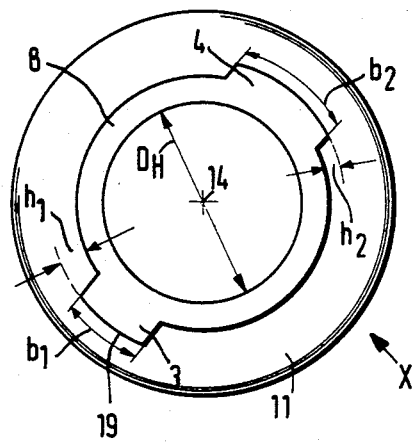
FIG. 3 is a schematic view from the rear onto the adapter flange.

In accordance with the present invention there is provided an attachment provision for exchangeable accessories such as reflectors, diffusion screens, lamp screens or the like at illumination bodies and light fixtures and in particular at photographic flash lamps. An adapter plate 1 with a recess 7 for an adapter flange 2 provided at an accessory part 11 is attached to an illuminating body 10. At least two cams (3, 4) of different dimensions $h_1$, $b_1$, $h_1$, $h_2$ are disposed at a distance from each other at the adapter flange 2. The two cam toes engage the edge 12 of the receiver opening 7 over an angle range of about 360 degrees around a middle axis 13 of the receiver opening. In each case one recess 5 or, respectively, 6 corresponding to a cam toe 3 or, respectively, 4 as well as corresponding to the dimensions $h_1$, $b_1$ or, respectively, $h_2$, $b_2$ of the corresponding cam toe 3 or, respectively 4 is provided in the edge of the edge of the adapter plate for releasing the cam toe 3 or, respectively, 4.

The receiving opening 7 is a circular opening concentric with the middle axis 13 in the adapter plate and the adapter flange 2 comprises cylindrical hub eye stump 8 with peripheral rim, where the outer diameter $D_H$ corresponds approximately to the inner diameter $D_A$ of the receiving opening 7 and where the cam toes 3, 4 are disposed on its outer edge. Preferably, the hub eye stump 8 is attached to the backside of an accessory, for example of a reflector 11 in a coaxial position with respect to the optical axis of the accessory. The hollow eye hub stump 8 can be guided and supported in the receiving opening 7 with its jacket face.

The adapter flange 2 can be formed together with the accessory as a single part 11. The cam toes 3, 4 can have differing heights $h_{1,2}$ and widths $b_1$, $b_2$ and the recesses 5, 6 can be constructed with correspondingly different widths and lengths. One of the cam toes 4 can be constructed wider in circumferential direction and shorter in radial direction as compared with the other toe cam 3. The cam toes 3, 4 and the correspondingly disposed receiving openings 5, 6 can be disposed at equal distances along the circumferential angular dimension.

The adapter plate 1 can be formed with the illuminating body 11 as one piece. A spring element 9 can protrude into at least one recess 5 as a catch device. The spring element 9 can protrude by a preset length amount radially into the recess 5 coordinated to the higher cam toe 3, where the length is smaller or equal to the height difference $h_1-h_2$ of the two cam toes 3, 4. The edges of the spring element 9 directed in circumferential direction and of the coordinated cam toe are inclined, where the inclined faces 15 of the two parts are directed toward each other. The spring element 9 is disposed at the back side of the adapter plate 1 and formed as a single piece with the same. The spring element can be disposed on the side of the illuminating body 10 and be formed as a single part with the same. The reflector 11 can be of an asymmetric shape.

The adapter flange is inserted into the receiver opening of the adapter plate, where the toe cams pass through recesses coordinated to the toe cams and corresponding in size to the size of the cam toes. Upon a following rotary motion in each case the cam toes grip under the edge of the receiver opening. Now the accessory such as for example a reflector can be rotated by 360 degrees without releasing the adapter flange or, respectively, the toe cams. Since the cam toes preferably are of different size, one cam toe can exit only through the corresponding recess in each case, that is in the area of the smaller recess the larger cam toe will not be released. This can also hold for the smaller formed cam toe in the region of the larger opening depending on the specific configuration. This way an accessory such as a reflector can be exchanged rapidly and without additional tools, where each reflector can be rotated with respect to the middle axis by an angle of up to 360 degrees, whereby it is possible to set any desired positions, which is a large advantage in particular in the case of asymmetric reflectors and light diffusers. The adapter flange preferably comprises a cylindrical hollow eye hub stump, while the receiving opening in the adapter plate is provided by a concentric opening, which supports and guides the eye hub stump. Thus the illumination body and the accessory can be easily aligned along a joint optical axis.

The adapter plate 1 corresponds in its outer dimensional sizes accordingly to the extensions and to the form of an illuminating body. The adapter plate 1 is fixed with four screws 16 on the front face of the illuminating body 10 according to the embodiment shown. It can also be advantageous to provide the adapter plate 1 with the illuminating body 10 as one piece such that additional attachment means are not required.

The adapter plate is provided with a central circular opening which forms a receiving opening 7 for the adapter flange 2 of an accessory part, for example of a reflector 11. The adapter flange 2 comprises a cylindrical hollow eye hub stump 8, which is spacially fixed at a coaxial position relative to the middle axis 14 or, respectively, to the optical axis of the reflector 11 on its back side. It can be advantageous to provide the accessory such as for example the reflector 11 as one single piece with the hollow eye hub stump 8.

Toe cams 3, 4 protruding radially outwardly are disposed on the jacket face of the hollow eye hub stump, which cam toes are preferably produced as part of a single piece with the hollow eye hub stump. The cam toes have the same distance from each other angularly along the periphery, that is the two cam toes 3, 4 shown are disposed diametrically with respect to each other. Three or more cam toes can be provided if required, and the cam toes are then preferably be distributed uniformly and correspondingly over the periphery of the hollow eye hub stump 8, where the cam toes 3, 4 are disposed in a joint radial plane.

The receiving opening 7 is provided with an inner diameter $D_A$ corresponding to the outer diameter $D_H$ of the hollow eye hub stump 8 such that the outer jacket face of the hollow eye hub stump is guided and supported at the inner face of the receiving opening 7. The cam toes 3, 4 are provided with different size dimensions $h_1$, $b_1$, $h_2$, $b_2$ and they pass through recesses 5, 6 with sizes corresponding to their own dimensions in the edge 12 of the receiving opening 7 upon insertion of the hollow eye hub stump, in order to grip under the edge 12 of the receiving opening 7 upon a rotation of the adapter flange 2 around the middle axis 13 of the receiver opening 7, whereby the reflector position is fixed with respect to its axis.

The hollow eye hub stump 8 is provided with such an axial length that the axial free space 17 formed between the cam toes 3, 4 and the reflector wall corresponds to the thickness d of the edge 12 to be gripped, such that the edge 12 is received into the free space 17 substantially free of play, with the result that the deflector 11 is kept in a tight position relative to the middle axis 13 in connection with the cam toes 3 and 4.

The toes 3 and 4 are formed differently in their radial height $h_1$ or, respectively, $h_2$ as well as in their width $b_1$ or, respectively, $b_2$ measured in the peripheral circumferential direction of the hollow eye hub stump 8. For example, the cam toe 3 is provided with a width $b_1$, which is smaller than the width $b_2$ of the cam toe 4, while the toe cam 4 has a height $h_2$, which is less than the height $h_1$ of the cam toe 3. Each recess 5 or, respectively, 6 in each case is fixedly coordinated to in each case one toe cam 3 or, respectively, 4 and exhibits correspondingly adapted dimensions $h_1$, $b_1$ or, respectively, $h_2$, $b_2$. Thus a passage is possible in each case only for the toe cam 3 or, respectively, 4 through the corresponding recess 5 or, respectively, 6.

The reflector can be rotated by nearly 360 degrees around the middle axis 13 upon insertion of the adapter flange 2 into the adapter plate 1 without having one of the cam toes 3 or 4 released by the edge 12. After a rotation by 180 degrees the cam toe 3 will be disposed below the recess 6, while the cam toe 4 is disposed below the recess 5. The recess 6 in fact exhibits a width $b_2$, which is larger than the width $b_1$ of the cam toe 3, its height $h_2$ however is less than the height $h_1$ of the cam toe 3, such that the front end 19 of the cam toe 3 grips under the narrow edge section 18 of the receiving opening 7, whereby the cam toe 3 is held axially in the recess 6 such that it cannot get lost. The diametrically opposite recess 5 in fact shows a height $h_1$, which is larger than the height $h_2$ of the cam toe 4 disposed below it. However, since the width $b_2$ of the cam toe 4 is larger than the width $b_1$ of the recess 5, this toe cam 4 also is so kept in the recess 5 such that it cannot get lost in the axial direction.

The edges disposed in the circumferential direction are canted in order to provide an easier cooperation of the spring element 9 with its coordinated toe cam 3, where however in each case the inclined faces 15 of the parts disposed oppositely to each other are located adjacently.

The spring element 9 is fixed on the back side of the adapter plate 1 or on the front side of the illuminating body 10 turned toward the adapter plate 1. Preferably however the spring element is produced together with the adapter plate 1 or, respectively the illuminating body 10 as one single part.

According to a further feature of the invention all parts, that is the adapter plate 1 as well as the accessory part with the adapter flange 2, are produced of a metal or of a plastic material. It can also be advantageous to produce the illuminating body in each case from the same material. It can be advantageous according to some application embodiments to produce parts combined of plastic and of metal.

It will be understood that each of the elements described above, or two or more together, may also find a useful application in other types of illumination system configurations and appliance attachment procedures differing from the types described above.

While the invention has been illustrated and described as embodied in the context of an attachment provision for exchangeable accessories at illumination bodies, it is not intended to be limited to the details shown, since various modifications and structural changes may be without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An attachment provision for exchangeable accessories for illumination bodies comprising an illumination body;
    an adapter plate having a receiving opening and which is attached to the illumination body for supporting a accessory having an axis and the adapter plate having at least two recesses for receiving and supporting an adapter flange of an accessory and wherein the recesses are disposed at a distance, but are not disposed such that they would meet the requirements of an n-fold rotation axis with n equal to or larger than 2 for coinciding with said axis; and an accessory having an adapter flange with at least two cam toes to grip through the recesses of the adapter plate where the cam toes are disposed at a distance, but are not disposed such that they would meet the requirements of an n-fold rotation axis directed vertically to the flange plane with n equal to or larger than 2 for said axis and where the cam toes support the accessory.

2. The attachment provision for exchangeable accessories at illumination bodies according to claim 1 wherein the two cam toes have different widths.

3. The attachment provision for exchangeable accessories at illumination bodies according to claim 1 wherein the two cam toes have different radial extensions.

4. The attachment provision for exchangeable accessories at illumination bodies according to claim 1 wherein two cam toes have their middle centers disposed at circumferential locations where the intermediate angles are different from 180 degrees.

5. The attachment provision for exchangeable accessories at illumination bodies according to claim 1 wherein the cam toes of the adapter flange grip over the adapter plate upon insertion and rotation and where there is only one relative radial position over an angle range of 360 degrees which allows removal of the adapter flange from the supporting adapter plate.

6. The attachment provision for exchangeable accessories at illumination bodies according to claim 1 wherein the receiving opening is a substantially circular opening concentric to the middle axis and where the adapter flange comprises a cylindrical internal hub, the outer diameter of which corresponds about to the inner diameter of the receiving opening and on the outer rim of which are disposed the cam toes.

7. The attachment provision for exchangeable accessories at illumination bodies according to claim 6 wherein the internal hub of the adapter flange is attached on the backside of an accessory, modifying the direction of the light coming from the illumination body, in a position coaxial to the optical axis of the accessory.

8. The attachment provision for exchangeable accessories at illumination bodies according to claim 6 wherein the internal hub is guided and supported with its jacket part in the receiving opening of the adapter plate.

9. The attachment provision for exchangeable accessories at illumination bodies according to claim 1 wherein the adapter flange with the accessory is formed as one piece.

10. The attachment provision for exchangeable accessories at illumination bodies according to claim 1 wherein the cam toes are provided with different width and with different radial extension and where the recesses are each corresponding to one cam toe of correspondingly different width and radial depth.

11. The attachment provision for exchangeable accessories at illumination bodies according to claim 10 wherein one cam toe is wider in circumferential direction than the other cam toe and where the wider cam toe is radially less extended than the other cam toe.

12. The attachment provision for exchangeable accessories at illumination bodies according to claim 1 wherein the angular distances of the cam toes from each other and of the recesses from each other are the same angle values.

13. The attachment provision for exchangeable accessories at illumination bodies according to claim 1 wherein the adapter plate with the illumination body is formed as one piece.

14. The attachment provision for exchangeable accessories at illumination bodies according to claim 1 further comprising
a spring element protruding into one recess as a catching device.

15. The attachment provision for exchangeable accessories at illumination bodies according to claim 14 where the spring element protrudes by a preset amount radially into the recess corresponding to the radially higher extended cam toe, where the amount is smaller or equal to the length difference of the two cam toes.

16. The attachment provision for exchangeable accessories at illumination bodies according to claim 15 wherein the edges of the spring element disposed in radial direction and of the corresponding cam toe are inclined, where the inclined faces are directed toward each other.

17. The attachment provision for exchangeable accessories at illumination bodies according to claim 15 wherein the spring element is disposed at the back side of the adapter plate and provided with the adapter plate as a single part.

18. The attachment provision for exchangeable accessories at illumination bodies according to claim 15 wherein the spring element is disposed on the side of the illumination body disposed toward the adapter plate and is formed with the adapter plate as one piece.

19. Attachment provision for exchangeable accessories such as reflectors, diffusing screens or the like at illumination bodies and in particular flash lamps wherein an adapter plate with a recess for an adapter flange disposed at an accessory is attached to the illumination body, and where at least two cam toes of different dimensions are disposed at the adapter flange at a distance from each other, which grip the edge of the adapter plate over an angle of about 360 degrees around a middle axis of the adapter plate, where in each case a recess coordinated to a toe cam and corresponding to the dimensions of the coordinated cam toe is provided in the edge of the adapter plate for the release of the cam toe.

20. A method for attaching exchangeable accessories at illumination bodies comprising
attaching an adapter plate at the illumination body with a recess for an adapter flange at an accessory;
providing at least two cam toes of different dimensions at a distance from each other at an adapter flange, which are adapted to grip over the edge of the adapter plate over an angle of about 360 degrees around a middle axis of the adapter plate;
passing the cam toes attached to the edge of the adapter flange through the corresponding recesses in the edge of the adapter plate for releasing the accessory from the illumination body or for attaching the accessory to the illumination body.

* * * * *